Nov. 1, 1932.　　　　　E. A. HALL　　　　　1,885,433
GAS CONTROLLING MEANS
Filed March 5, 1931　　　　2 Sheets-Sheet 1

Inventor
Ernest A. Hall
By Owen & Owen
Attorneys

Nov. 1, 1932.  E. A. HALL  1,885,433
GAS CONTROLLING MEANS
Filed March 5, 1931   2 Sheets-Sheet 2
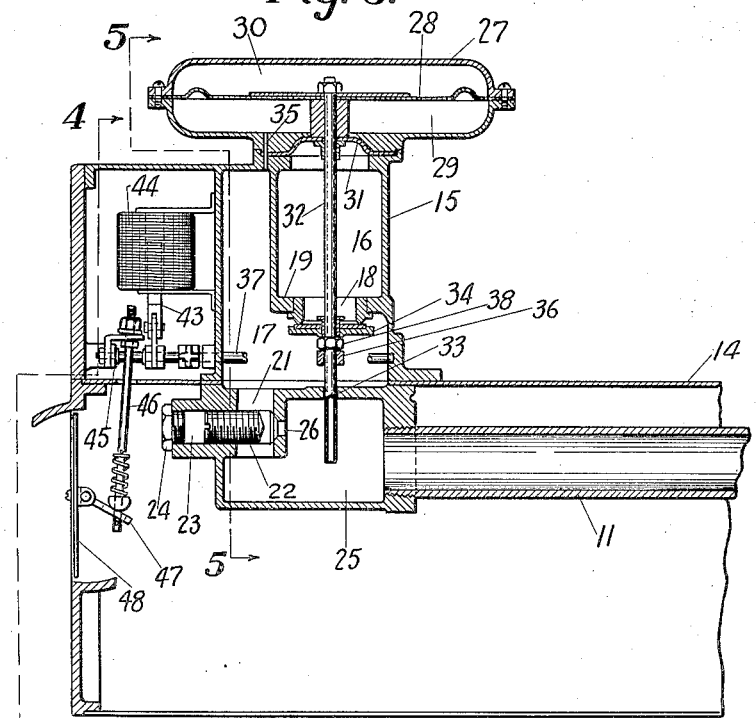
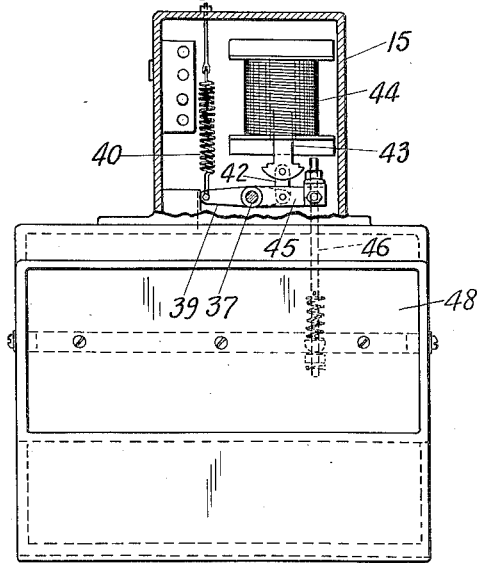
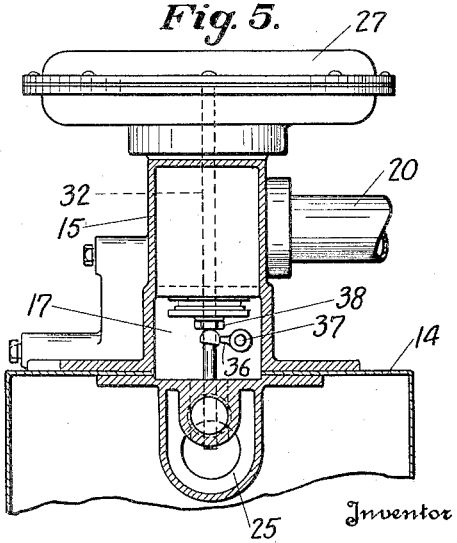
Inventor
Ernest A. Hall
By Owen & Owen
Attorneys Patented Nov. 1, 1932

1,885,433

UNITED STATES PATENT OFFICE

ERNEST A. HALL, OF TOLEDO, OHIO, ASSIGNOR TO THE COLUMBIA BURNER COMPANY, OF TOLEDO, OHIO, A CORPORATION OF OHIO

GAS CONTROLLING MEANS

Application filed March 5, 1931. Serial No. 520,263.

This invention relates to gas controlling means, and more particularly to thermostatic control means associated with a pressure regulator to be used in connection with a gas heating system.

Heretofore, in gas heating plants, it has been common to provide two automatically controlled valves, one associated with the pressure regulator and the other associated with the thermostat. In such a system, the action of the pressure regulating valve is invariably modified by variations in the position of the thermostatically controlled valve, resulting in wide fluctuations in the pressure.

The object of the present invention is to provide means for maintaining a substantially constant pressure as long as gas is being supplied to the burner and to provide means for shutting off the supply when the temperature in the region of the thermostat rises above a certain point and for turning it on again when more heat is required. In attaining this object, the thermostatic controlling means, instead of being associated with a valve individual thereto, acts to close the pressure regulator valve when no heat is required and to release the same when more heat is required, so that the pressure regulator may then function in the normal manner. In opening or closing the valve, it is actuated in one direction by a solenoid and in the opposite direction by a spring, so that the valve acts quickly and prevents any back-firing. It is preferred also to control the air supply to the burner by means of an air door or damper connected to the valve or to the valve actuating mechanism.

The present application is in part a continuation of my earlier application No. 442,051, filed April 7, 1930.

My invention will be more specifically explained in connection with the accompanying drawings, in which—

Figure 3 is a vertical section taken on the line 3—3 of Figure 2;

Figure 4 is a sectional view taken on the line 4—4 of Figure 3;

Figure 5 is a sectional view taken on the line 5—5 of Figure 3.

Figure 1:
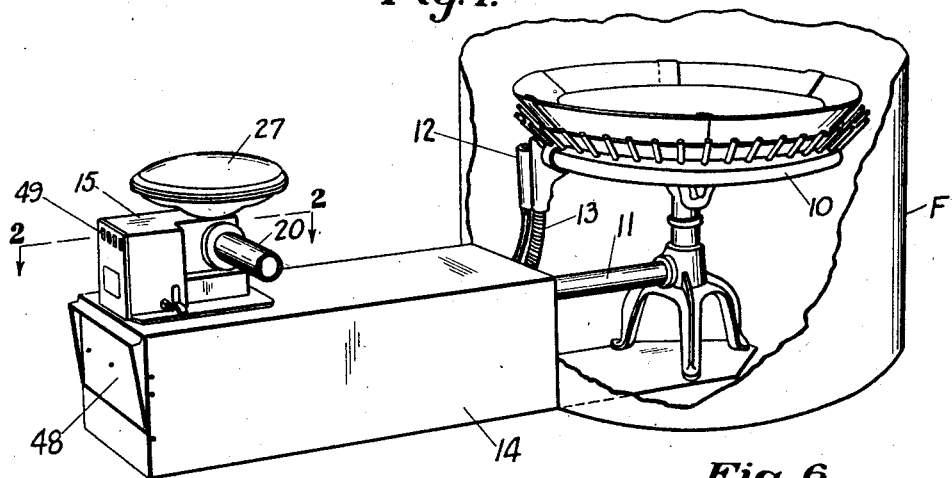
Figure 1 is an isometric view of the invention adapted for use in connection with a gas furnace.
Figure 6:
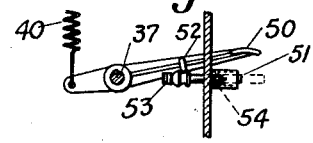
Figure 6 is a section taken on the line 6—6 of Figure 2, showing the manual control means.

As illustrated in the drawings, the invention is associated with a gas burner 10 which is adapted to be located within a furnace F and to which gas is supplied through a pipe 11. The burner 10 is usually provided with a pilot light 12 which may be provided with controlling means protected from the heat of the furnace by a current of cool air supplied from outside the furnace through a conduit 13, as explained in my application No. 443,955, filed April 14, 1930. Air is supplied to the furnace through a box 14 connected with the bottom thereof.

Associated with the regulating device to which my invention relates, is a casing 15 mounted in the present instance on the box 14. This casing has a gas inlet chamber 16 and a gas outlet chamber 17, which have communication with each other through a vertically disposed orifice 18 provided in the separating partition 19. Gas is admitted to the chamber 16 at line pressure through a pipe 20 and is discharged from the chamber 17 through an outlet passage 21. This outlet passage is restricted to the desired extent to suit the maximum desired requirement of the particular installation by an adjustable plug or valve 22. The valve 22 is mounted in a screw threaded opening 23 and after it is set the outer end of the opening is closed by a plug 24. The passage 21 in the present instance opens into a chamber 25, from which the pipe 11 leads to the burner or burners, the gas supply of which is to be regulated. It is also desirable to provide a by-pass 26 opposite the valve 22 in order to prevent swirling of the gas as it enters the chamber 25.

An auxiliary casing 27 is mounted on the casing 15 over the chamber 16 and is divided by a flexible diaphragm 28 into a lower compartment 29 and an upper compartment 30. Communication between the diaphragm chamber 29 and the gas inlet chamber 16 is closed by an auxiliary diaphragm 31 therebetween.

A tubular stem 32 is secured centrally to the diaphragms 28 and 31 and extends through the valve orifice 18 and through a guide opening 33 into the chamber 25. The stem 32 carries a pressure regulating valve 34 which is adapted to seat against the lower edge of the orifice 18 to close the communication between the chambers 16 and 17 and by a downward movement from its seat to effect an opening of such communication. This movement of the valve 34 to control the pressure of the gas supplied to the burner is normally determined by the pressure in the chamber 17 which communicates through a small passageway 35 with the chamber 29 beneath the diaphragm 28. Under certain conditions however, as for example, when no heat is required, the valve 34 is completely closed, regardless of the pressure in the chamber 17, by an arm 36 secured to a rock shaft 37 and engageable with an abutment 38 on the stem 32.

Figure 2:
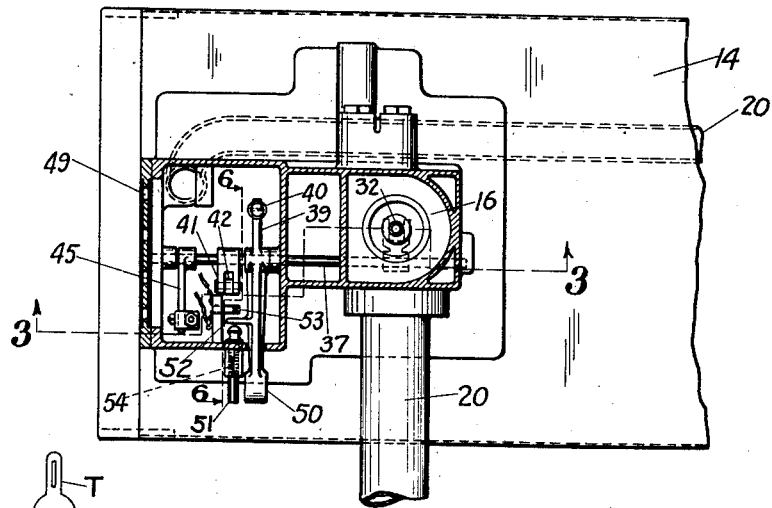
Figure 2 is an enlarged horizontal section taken on the line 2—2 of Figure 1.

As shown in Figures 2 and 4, an arm 39 secured to the rock shaft 37 has its end connected by a spring 40 to some fixed point, as for example, the upper wall of the casing 15, which tends to hold the arm 36 against the abutment 38 to cut off the supply of gas to the burner.

Figure 7:
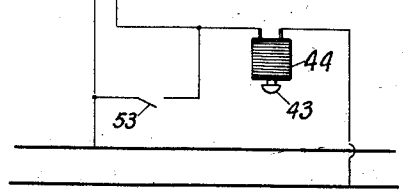
Figure 7 is a wiring diagram of the solenoid circuit.

In case heat is called for, however, which condition may be determined by a thermostat T in one of the rooms to be heated by the furnace, the shaft 37 is rocked in opposition to the spring 40 to move the arm 36 out of operative contact with the abutment 38, thus permitting the valve 34 to be controlled in the normal manner by the pressure regulating device. For this purpose, another arm 41 secured to the rock shaft 37 is connected by a link 42 to the core 43 of a solenoid 44. The circuit through the solenoid is connected to the thermostat T, as illustrated in Figure 7, so that when the latter reaches a predetermined minimum temperature the circuit through a solenoid is closed, thus causing the core 43 to be raised with a snap to release the valve 34. When the temperature of the thermostat becomes high enough to open the circuit through the solenoid the core 43 is released and the spring 40 causes the valve 34 to close with a snap and to cut off the supply of gas to the furnace.

It is also desirable to control the supply of air to the furnace in accordance with the operation of the burner. For this purpose, an arm 45 is secured to the rock shaft 37 and is connected by a link 46 to the arm 47 of an air valve or damper 48 in such a manner that the damper 48 will be opened when the valve 34 is opened and will be closed when the valve 34 is closed. Whenever the gas to the burner is cut off and the damper 48 is closed, there is always sufficient air supplied through openings 49 in the casing 15 to support combustion at the pilot light 12.

Although the operation of the burner and the control of gas thereto is entirely automatic and ordinarily does not need to be touched by an operator, it is desirable to provide manual controlling means to be used in the event that there is a failure of the electric current. For this purpose, a manual control arm 50 is secured to the rock shaft 37. This manual control arm may be raised to permit the valve 34 to be actuated normally by the pressure regulator and may be latched in such position by a push button 51 which interlocks with a lug 52 projecting laterally from the arm 50. When the push button 51 is thus actuated, it closes a switch 53 which is connected in series with the solenoid 44 and parallel to the line through the thermostat T, as illustrated in Figure 7. By such a device, as soon as the electric current is restored, the solenoid is energized and rocks the shaft 37 to raise the arm 50 sufficiently to release the push button 51, which is returned to its normal position by a spring 54, permitting the switch 53 to open and thus restoring the automatic control without further attention from the operator.

It is to be noted that, as long as heat is needed, the solenoid is energized to release the valve 34 and permit the pressure regulator to act normally to control the flow of gas through the orifice 18 so as to maintain a constant supply of gas to the burner. As heat develops at the burner, it has a tendency to cause an expansion of the gas in the burner line and to set up a back pressure. The passageway through the tubular stem 32, however, equalizes the effect of such back pressure by permitting it to enter the upper diaphragm compartment 30 to the same extent that it enters the lower compartment 29. With this arrangement the maximum variation of pressure in the burner line, as indicated on a water glass, does not exceed $\frac{1}{10}$ inch.

As soon as the temperature of the thermostat has risen to the maximum for which it is set, the circuit through the solenoid is interrupted and the valve 34 closes quickly. When the solenoid is again energized the valve 34 opens with a snap so that gas is supplied to the burner in sufficient volume to be lighted all at once without back-firing.

I wish it understood that my invention is not limited to any specific construction, arrangement or form of the parts, since it is capable of numerous modifications without departing materially from the scope of the appended claims.

What I claim is:

1. In combination, a gas supply line pressure regulator comprising a valve, means including a thermostat operable at a predetermined room temperature independently of the gas pressure to completely close said valve and to maintain it closed, thus cutting off the supply of gas, and means operable at another predetermined temperature to render said valve closing means ineffective and permit said valve to function normally as a pressure regulator.

2. In combination, a gas supply line pressure regulator comprising a valve, means operable at a predetermined temperature independently of the gas pressure to completely close said valve and maintain it closed, thus cutting off the supply of gas, an electric circuit having an open switch at said predetermined temperature, means for closing said switch upon a change to another predetermined temperature, and means electrically operated upon the closing of said switch to render the first mentioned means ineffective and permit said valve to function normally as a pressure regulator.

3. In combination, a gas supply line pressure regulator comprising a valve which is normally open when the room temperature in a given region is below a predetermined point, means including a thermostat normally operable independently of the gas pressure when said temperature is at one point to close said valve and retain it closed, and means actuated when said temperature is at another point to render said first mentioned means inoperative, thus releasing said valve and permitting it to function normally as a pressure regulator.

4. In combination, a gas supply line pressure regulator having a valve, means independent of the gas pressure and normally acting on said valve to retain it closed, and electrical means responsive to certain temperature conditions at a distant point to act on said first mentioned means to release the valve and permit to function normally as a pressure regulator.

5. In combination, a thermostat, a gas pressure regulator valve, mechanical means independent of the gas pressure and normally operable to hold said valve closed when a predetermined temperature exists in the region of the thermostat, electrical means connected with the thermostat so as to be energized when another predetermined temperature occurs in the region of the thermostat, and means actuated by said electrical means, when energized, to render said mechanical means inoperative and permit said valve to function normally as a pressure regulator.

6. In combination, a thermostat, a gas pressure regulator valve, mechanical means independent of the gas pressure and normally operable to hold said valve closed when no heat is required in the region of the thermostat, electrical means connected with the thermostat so as to be energized when heat is required, and means actuated by said electrical means, when energized, to render said mechanical means inoperative and permit said valve to function normally as a pressure regulator.

7. In combination, a gas line pressure regulator having a normally open line valve, a member mounted in the regulator and movable independently of the gas pressure to engage and close the valve and also to release it for free opening and closing movements, spring means acting on said member to normally cause it to engage and retain the valve seated, and means responsive to certain temperature conditions at a predetermined point to act on said member to move it to and retain it in valve released position.

8. In a gas line pressure regulator, a partition dividing the gas line into inlet and outlet chambers and having an opening therethrough, means forming a restricted outlet passage from said outlet chamber, means forming a diaphragm chamber, a diaphragm in said chamber dividing it into separated compartments, one of said compartments having communication with said outlet chamber, a valve adapted to close the opening in said partition and having a stem connected to said diaphragm whereby movements of the diaphragm impart opening or closing movements to the valve, said stem having a passage therethrough which opens communication between the diaphragm chamber compartment which does not have communication with said outlet chamber and said outlet passage at the restricted side thereof.

9. In a gas supply line pressure regulator, means forming gas inlet and outlet chambers with an opening therebetween, a restricted outlet passage from the outlet chamber and a diaphragm chamber, a diaphragm in the diaphragm chamber dividing it into upper and lower compartments, a valve adapted to close said opening at the outlet side thereof and having a tubular stem attached to said diaphragm whereby the valve is moved by movements of the diaphragm, said lower diaphragm compartment having communication with said outlet chamber and said upper diaphragm compartment having communication through said tubular stem with said outlet passage at the outlet side of its restricted portion.

10. The combination with a gas burner and a gas pressure regulator having a valve, of means independent of the gas pressure including a thermostat operable at a predetermined room temperature to completely close said valve and to maintain it closed, thus cutting off the supply of gas, means controlled by the thermostat and operable at another predetermined room temperature to render said valve closing means ineffective and permit said valve to function normally as a pressure regulator, a damper for controlling the supply of air to the burner, and means to close the damper when said valve closing means is actuated to close the valve and to open said damper when said valve closing means is rendered ineffective.

11. The combination with a gas burner and a gas pressure regulator having a valve, of means independent of the gas pressure normally acting on said valve to retain it closed, electrical means responsive to certain temperature conditions at a distant point to act on said first mentioned means to release said valve and permit it to function normally as a pressure regulator, a damper for controlling the supply of air to the burner, and means operating in conjunction with said first mentioned means to close the damper when the first mentioned means closes the valve and to open the damper when said valve is released.

12. The combination with a gas burner and a gas pressure regulator having a valve, of a rock shaft provided with an arm acting on said valve to positively close the same when said shaft is rocked in one direction and to release the same to permit it to function normally as a pressure regulator when the shaft is rocked in the other direction, a damper for controlling the supply of air to the burner, means connecting the rock shaft to the damper to open the latter only when the shaft is rocked to release said valve, and thermostatic means controlling said rock shaft independently of the gas pressure.

13. In combination, a gas burner, electrical means normally responsive to temperature conditions for automatically controlling the supply of gas to the burner, manually operable means for controlling the gas supply when the electric current fails, and means for automatically rendering said manual control ineffective as soon as the electric current is restored.

14. In combination, a gas burner, electrical means normally responsive to temperature conditions for automatically supplying gas to the burner, said means being effective to cut off the gas whenever the electric current fails, manually operable means for subsequently controlling the supply of gas, and means for automatically rendering said manual control ineffective as soon as the electric current is restored.

15. The combination with a gas burner and a gas pressure regulator having a valve, of a member adjacent said valve, electrical means, operable when energized, to move said member out of operative relation to the valve to permit the latter to operate normally as a pressure regulator, and automatic means for actuating said member independently of the gas pressure, when said electrical means is deenergized, to engage said valve and completely close the same.

16. The combination with a gas burner and a gas pressure regulator having a valve, of a member adjacent said valve, electrical means, operable when energized, to move said member out of operative relation to the valve to permit the latter to operate normally as a pressure regulator, automatic means for actuating said member, when said electrical means is deenergized, to engage said valve and completely close the same, manually operable means to subsequently withdraw said member and latch it out of operative relation to the valve, and means operable by said electrical means, when it is again energized, to render said manually operable means ineffective.

17. The combination with a gas burner, of a gas pressure regulator, a gas line between the pressure regulator and the burner including a restricted passage through which the gas passes, a chamber adjacent the outlet end of said passage, and a by-pass from the side of said passage into said chamber to prevent swirling of the gas as it enters the chamber.

18. The combination with a gas burner, of a gas pressure regulator, a gas line between the pressure regulator and the burner including a restricted passage through which the gas passes, a valve adjustable transversely of said passage to adjust the restriction to the maximum requirement of the burner, a chamber adjacent the outlet end of said passage, and a by-pass from the side of said passage opposite said valve into said chamber to prevent swirling of the gas as it enters the chamber.

In testimony whereof I have hereunto signed my name to this specification.

ERNEST A. HALL.

CERTIFICATE OF CORRECTION.

Patent No. 1,885,433.  November 1, 1932.

ERNEST A. HALL.

It is hereby certified that error appears in the printed specification of the above numbered patent requiring correction as follows: Page 3, line 47, claim 4, after "permit" insert the word "it"; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.